US011513781B2

(12) United States Patent
Nagar et al.

(10) Patent No.: US 11,513,781 B2
(45) Date of Patent: Nov. 29, 2022

(54) SIMULATING CONTAINER DEPLOYMENT

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Jagadesh Ramaswamy Hulugundi, Bangalore (IN); Prashant Pillai, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/987,593

(22) Filed: Aug. 7, 2020

(65) Prior Publication Data
US 2022/0043641 A1 Feb. 10, 2022

(51) Int. Cl.
*G06F 8/60* (2018.01)
*G06N 5/04* (2006.01)
(Continued)

(52) U.S. Cl.
CPC .............. *G06F 8/60* (2013.01); *G06F 8/77* (2013.01); *G06N 5/04* (2013.01); *H04L 63/08* (2013.01)

(58) Field of Classification Search
CPC ..................................... G06F 8/60; G06F 8/77
(Continued)

(56) References Cited

U.S. PATENT DOCUMENTS 7,124,342 B2 * 10/2006 Wang ............. G01R 31/318364
714/744
7,269,773 B2 * 9/2007 Hori ....................... G06F 11/263
714/739
(Continued)

OTHER PUBLICATIONS

Adufu, Theodora, Jieun Choi, and Yoonhee Kim. "Is container-based technology a winner for high performance scientific applications?." 2015 17th Asia-Pacific Network Operations and Management Symposium (APNOMS). IEEE, 2015.pp.1-4 (Year: 2015).*
(Continued)

*Primary Examiner* — Satish Rampuria
(74) *Attorney, Agent, or Firm* — Kristofer L. Haggerty

(57) ABSTRACT

A computer-implemented method, computer system, and computer program product for a container deployment simulation. The method may include performing a container deployment simulation. The method may include detecting a container deployment simulation error. In response to detecting the container deployment simulation error, the method may include providing one or more recommendations to a user. In response to receiving an acceptance of the recommendation from the user, the method may include implementing the recommendation. In response to receiving a rejection of the recommendation from the user, the method may include receiving a user recommendation. The method may include implementing the user recommendation and performing the container deployment simulation. The one or more recommendations may have a weight value. The weight value of the one or more recommendations may be increased when the user accepts the one or more recommendations or reduced when the user rejects the one or more recommendations.

14 Claims, 6 Drawing Sheets

(51) Int. Cl.
　　　*H04L 9/40*　　　(2022.01)
　　　*G06F 8/77*　　　(2018.01)

(58) Field of Classification Search
　　　USPC .................................................. 717/168–178
　　　See application file for complete search history.

(56) References Cited

U.S. PATENT DOCUMENTS

| | | | |
|---|---|---|---|
| 7,900,201 | B1 | 3/2011 | Qureshi |
| 7,996,814 | B1 | 8/2011 | Qureshi |
| 8,386,866 | B2 * | 2/2013 | Chung ........... G01R 31/318555 714/742 |
| 8,640,123 | B2 | 1/2014 | Wookey |
| 9,612,821 | B2 | 4/2017 | Iyer |
| 2005/0114829 | A1 * | 5/2005 | Robin .................... G06Q 10/06 717/101 |
| 2018/0025160 | A1 * | 1/2018 | Hwang .................... G06F 8/71 726/25 |
| 2018/0196741 | A1 * | 7/2018 | Qureshi .................... G06F 8/60 |
| 2018/0210709 | A1 * | 7/2018 | Bharthulwar ........ G06Q 10/103 |
| 2018/0260201 | A1 * | 9/2018 | Liu ..................... G06F 11/0778 |
| 2019/0369980 | A1 * | 12/2019 | Mair ........................ H04L 67/34 |

OTHER PUBLICATIONS

Al Jawarneh, Isam Mashhour, et al. "Container orchestration engines: A thorough functional and performance comparison." ICC 2019- 2019 IEEE International Conference on Communications (ICC). IEEE, 2019.pp.1-6 (Year: 2019).*

Sebastio, Stefano, Rahul Ghosh, and Tridib Mukherjee. "An availability analysis approach for deployment configurations of containers." IEEE Transactions on Services Computing 14.1 (2018): pp. 16-29. (Year: 2018).*

Lyu, Michael R., Sampath Rangarajan, and Aad PA Van Moorsei. "Optimal allocation of test resources for software reliability growth modeling in software development." IEEE Transactions on reliability 51.2 (2002): pp. 183-192. (Year: 2002).*

Austin, Todd, Eric Larson, and Dan Ernst. "SimpleScalar: An infrastructure for computer system modeling." Computer 35.2 (2002): pp. 59-67. (Year: 2002).*

Xu, Guoqing, et al. "Software bloat analysis: Finding, removing, and preventing performance problems in modern large-scale object-oriented applications." Proceedings of the FSE/SDP workshop on Future of software engineering research. 2010.pp.421-425 (Year: 2010).*

Avi, "Container Deployment", Container Deployment Definition, © 2020 Avi Networks, 6 pages.

Benevides, "10 things to avoid in docker containers", Red Hat Developer, Blog Articles, Feb. 24, 2016, 12 pages.

Chen et al., "Using simulation to evaluate error detection strategies: A case study of cloud-based deployment processes", The Journal of Systems and Software 110 (2015) 205-221, © 2015 Elsevier.

Cornetta et al., "Modelling and Simulation of a Cloud Platform for Sharing Distributed Digital Fabrication Resources", computers, MDPI, Computers 2019, 8, 47, www.mdpi.com/journal/computers, pp. 1-29.

Docker, "What is a Container?", a standardized unit of software, Package Software into Standardized Units for Development, Shipment and Deployment, © 2020 Docker Inc., 5 pages.

https://cloud.google.com/containers/, "Containers 101: What are containers?", Containers at Google, a better way to develop and deploy applications, Google LLC, 2016, 10 pages.

Mell et al., "The NIST Definition of Cloud Computing", Recommendations of the National Institute of Standards and Technology, Special Publication 800-145, Sep. 2011, 7 pages.

Mohammed et al., "Failure prediction using machine learning in a virtualised HPC system and application", Cluster Computing (2019) 22:471-485, 15 pages.

Nikdel et al., "DockerSim: Full-stack Simulation of Container-based Software-as-a-Service (SaaS) Cloud Deployments and Environments", 2017 IEEE, 6 pages.

Piraghaj et al., "ContainerCloudSim: An Environment for Modeling and Simulation of Containers in Cloud Data Centers", Software—Practice and Experience, Softw. Pract. Exper. 2010; 00:1-17, Published online in Wiley InterScience www.interscience.wiley.com). DOI: 10.1002/spe, Copyright c 2010 John Wiley & Sons, Ltd., pp. 1-16.

Smith, "Container Fails", DZone, Mar. 8, 2019, 8 pages.

* cited by examiner

SIMULATING CONTAINER DEPLOYMENT

BACKGROUND

The present invention relates generally to the field of computing, and more particularly to container deployment. Container deployment is a method for quickly building and releasing complex applications. Container deployment may provide a fast access to environments and may speed up development because secure containers may be quickly downloaded and put to use.

BRIEF SUMMARY

Embodiments of the present invention may include a method, computer system, and computer program product for container deployment. Embodiments of the present invention may include performing a container deployment simulation. Embodiments of the present invention may include detecting a container deployment simulation error. In response to detecting the container deployment simulation error, embodiments of the present invention may include providing one or more recommendations to a user. In response to receiving an acceptance of the recommendation from the user, embodiments of the present invention may include implementing the recommendation. In response to detecting no container deployment simulation error, embodiments of the present invention may include providing a recommendation to the user that the container is ready for actual deployment. In response to receiving a rejection of the recommendation from the user, embodiments of the present invention may include receiving a user recommendation. Embodiments of the present invention may include implementing the user recommendation and performing the container deployment simulation. The one or more recommendations may have a weight value. The weight value of the one or more recommendations may be increased when the user accepts the one or more recommendations or reduced when the user rejects the one or more recommendations. Embodiments of the present invention may include receiving a simulation initiation command from the user and authenticating the user.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
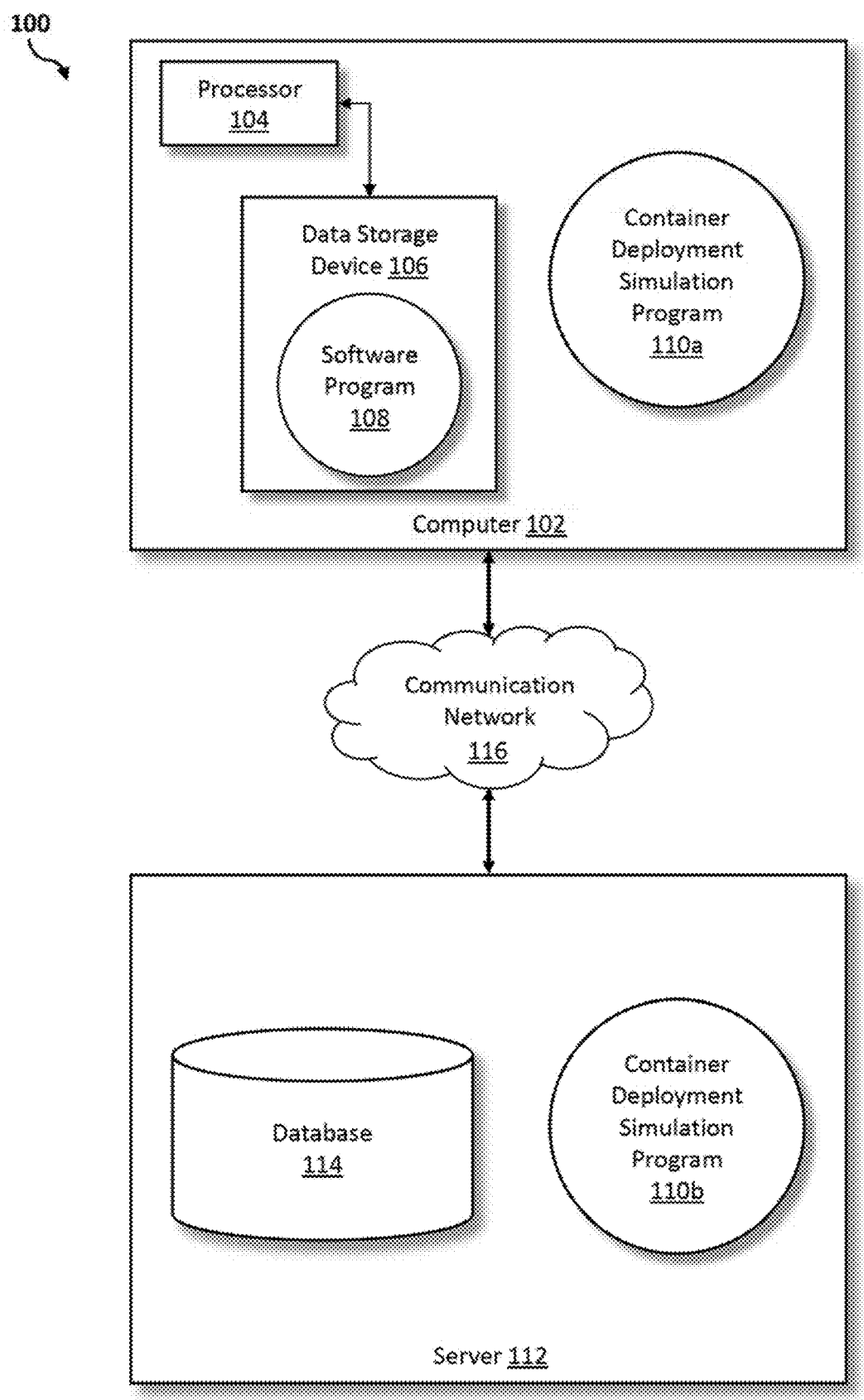
FIG. 1 illustrates a networked computer environment according to at least one embodiment.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to container deployment. More particularly, embodiments of the present invention provide a method, computer program, and computer system for simulating container deployment. Generally, container deployment may quickly build and release complex applications. Container deployment may provide a fast access to environments and may speed up development because secure containers may be quickly downloaded and put to use. Further, utilizing container deployment, a user may run many individual applications on the same number of servers.

Conventional container deployments have many drawbacks. For example, container deployments may experience deployment failures. Some failures may include, but are not limited to, database connection issues, URL issues, space issues, or container properties issues. Oftentimes, these issues come up during an actual container deployment, translating to longer than planned down times. The increase in down times may result in loss of revenue for the client. As a result, there exists a need to efficiently conduct container deployments within the specified down time.

The following described exemplary embodiments provide a system, method, and program product for simulating a container deployment. As such, embodiments of the present invention have the capacity to improve the technical field of container deployment by allowing the user to simulate a container deployment before the actual deployment takes place in order to determine whether any potential deployment failures exist. When there are no deployment failures, the user may proceed with the actual deployment. When deployment failures are determined, embodiments of the present invention provide recommendations to solve the failures. The user may accept the recommendations to fix, or solve, the issues underlying the deployment failures such that during actual container deployments these failures do not appear because they will have been solved during the simulation. The user may reject the recommendations and provide the user's own recommendations to fix the issues underlying the deployment failures.

Embodiments of the present invention use machine learning to lean from the simulation outcomes and apply that knowledge to subsequent container deployment simulations. Various types of machine learning (ML) models may be built to create predictive results for various domains. Machine learning models may also include deep learning models, active learning models and artificial intelligence (AI) models. Active learning may be used to interact with a user, such as the subject matter expert, to provide new data labels or label new datapoints. Training and updating a ML model may include supervised, unsupervised, and semi-supervised ML procedures. Supervised learning may use a labeled dataset or a labeled training set to build, train and update a model. Semi-supervised learning may use both labeled datasets and unlabeled datasets to train a deep learning model. Unsupervised learning may use all unlabeled data to train a deep learning model.

Supervised learning and semi-supervised learning may incorporate ground truth by having an individual check the accuracy of the data, data labels and data classifications. Individuals are typically a subject matter expert (SME) who have extensive knowledge in the particular domain of the dataset. The SME input may represent ground truth for the ML model and the provided ground truth may raise the accuracy of the model. The SME may correct, amend, update or remove the classification of the data or data labels by manually updating the labeled dataset. ML models improve in accuracy as datasets are corrected by a SME, however, manually annotating large amounts of data may be time-intensive and complex.

According to an embodiment, supervised or semi-supervised ML may be used to allow an individual (e.g., a user, a SME, an expert or an administrator) to have some control over the ML model by having the ability to validate, alter, update or change the training set. Users may provide input or feedback into a ML model by altering the training set as opposed to an unsupervised ML environment, when a user may not provide input to the data. The training set of data may include parameters of a classifier or a label for learning purposes and a supervised or semi-supervised ML environment may allow user to update the training set based on user experience.

Historical data and current data may be used for analysis and added to a knowledge corpus or a database that stores the training data, the real-time data, the predictive results, the user feedback and the model performance. Current data may, for example, be received from an internet of things (IoT) device, a global positioning system (GPS), a sensor, a smart watch, a smart phone, a smart tablet, a personal computer or an automotive device. Current data may generally refer to, for example, data relating to a user's preference and a collection method to obtain the user's preferences, such as via type-written messages, video content, audio content or biometric content. Historical data may include, for example, training data, user preferences, user historical feedback, previous model performance, model performance levels for each user and model learning curves.

Embodiments of the present invention provide a virtual insight into the possible failures, or errors, that may occur during a container deployment. Embodiments of the present invention also provide the user one or more recommendations of how to resolve, or fix, the errors. As a result, during an actual container deployment, the down time is minimal because all failures or errors will have been addressed during the simulation.

Embodiments of the present invention utilize machine learning to create a correlation pattern between the knowledge corpus and data that is being collected and analyzed during the simulation. The correlation may provide an insight whether the container deployment simulation may have failures. Further, once presented with one or more recommendations, the user may accept or reject the recommendations. The user's decision to either accept or reject the recommendation may be used in subsequent container deployment simulations during which failures are detected.

Referring to FIG. 1, an exemplary networked computer environment 100 is depicted, in accordance with an embodiment. The networked computer environment 100 may include a computer 102 with a processor 104 and a data storage device 106 that is enabled to run a software program 108 and a container deployment simulation program 110a. The networked computer environment 100 may also include a server 112 that is enabled to run a container deployment simulation program 110b that may interact with a database 114 and a communication network 116. The networked computer environment 100 may include a plurality of computers 102 and servers 112, only one of which is shown.

The communication network 116 may include various types of communication networks, such as a wide area network (WAN), local area network (LAN), a telecommunication network, a wireless network, a public switched network, and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communications network 116. The communications network 116 may include connections, such as wire, wireless communication links, or fiber optic cables. As will be discussed with reference to FIG. 4, server 112 may include internal components 902a and external components 904a, respectively, and client computer 102 may include internal components 902b and external components 904b, respectively.

The server 112 may operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud.

The client computer 102 may be, for example, a wearable computer glasses or other devices with augmented reality overlay capability that add information alongside of or in place of what the wearer sees in the physical environment, for example Google Glasses, but is not limited to such. Other examples of the client computer 102 may include a mobile device, a telephone, a personal digital assistant, a netbook, a laptop computer, a tablet computer, a desktop computer, or a peripheral device such as a smartwatch or other wearable device, or any type of computing devices capable of running a program, accessing a network, accessing a database 114, and supporting the functionality required by one or more embodiments of the invention.

The client computer 102 may include a user interface (not shown). The user interface may include components used to receive input from a user on the client computer 102 and transmit the input to another client computer and display the information to the user on the client computer 102. For example, the user interface may display an input area where the user may input the user's credentials.

According to various implementations of the present embodiment, the container deployment simulation program 110a, 110b may interact with a database 114 that may be embedded in various storage devices, such as, but not limited to a computer 102, a networked server 112, or a cloud storage service.

According to an embodiment, a user utilizing a client computer 102 or a server 112 may use the container deployment simulation program 110a, 110b (respectively) to simulate a container deployment. The method to simulate a container deployment is explained in more detail below with respect to FIGS. 2-3.

Figure 2:
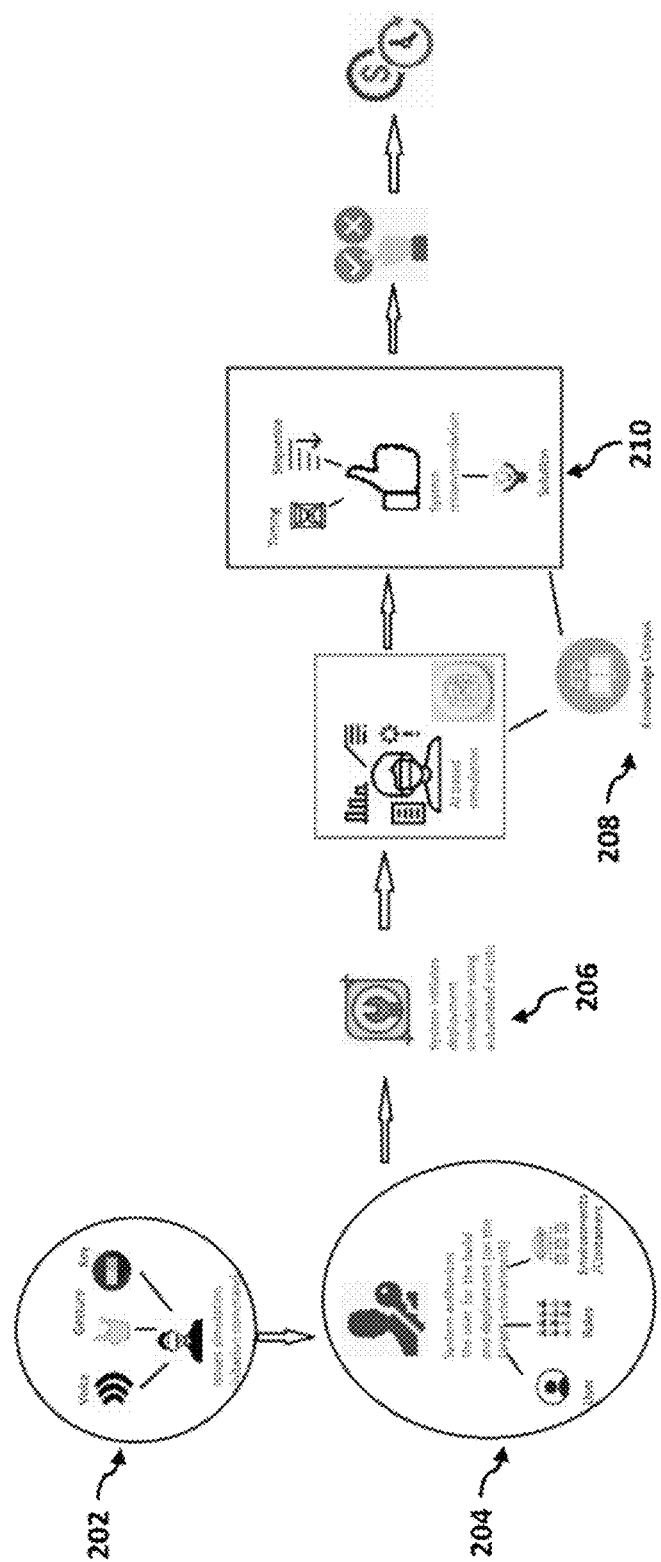
FIG. 2 is a block diagram illustrating an example of performing a container deployment simulation, in accordance with an embodiment of the invention.

Referring to FIG. 2, a block diagram example of performing a container deployment simulation using the container deployment simulation program 110a, 110b, is shown, in accordance with an embodiment. The container deployment simulation may be triggered, or initiated, by command 202. The command 202 may be a voice command, a gesture, a key input, a biometric scan, or any other command that is supported by the container deployment simulation program 110a, 110b. For example, the user may use virtual reality glasses, such as a headset, to perform the container deployment simulation. After putting the virtual reality glasses on, the user may initiate the container deployment simulation by stating "start simulation." In another example, after the user puts the virtual reality glasses on, the user may initiate the container deployment simulation by flashing a gesture command in front of the virtual reality glasses. The gesture command may be a thumbs-up or any other gesture that may be recognized by the container deployment simulation program 110a, 110b as the command 202.

Once the user issues the command 202, an authentication is performed to determine whether the user is authorized to perform the desired simulation. The authentication may be performed by the container deployment simulation program 110a, 110b. During the authentication, the container deployment simulation program 110a, 110b may review different criteria 204 to determine whether the user who is attempting to run the simulation is authorized to do so. The criteria 204 may be set by the user and may be changed at any time. The criteria 204 may include, but are not limited to, an identity of the user, the user's role in a development team, a geographical location of the user, the device, such as, for example, the computer 102 illustrated in FIG. 1, that the user may be using when attempting to perform the simulation, or any constraints that may be placed on the user, or the particular simulation. The criteria 204 may be located in a database, such as, for example, the database 114. Each user may have different criteria 204 saved in the database 114. For example, user A may have criteria 204 respecting geographical location and identity whereas user B may have criteria 204 respecting identity and the user's role in a development team.

After the user is authenticated, the container deployment simulation program 110a, 110b may initiate deployment simulation using automated scripts 206. The automated scripts 206 may pull source codes from a source repository in order to perform the container deployment simulation. The source repository may be a database where source codes are stored. The pulled source codes may be converted into one or more images utilizing docker containers.

The container deployment simulation program 110a, 110b may utilize machine learning in conjunction with a knowledge corpus 208 to perform the simulation and provide one or more recommendations 210 to the user. Besides the recommendations 210, the knowledge corpus 208 may also include the following information. The knowledge corpus 208 may include historical deployment results of a given container, such as, for example, successes and failures as understood by the program. For example, the knowledge corpus 208 may include information respecting the type of fixes that may be applied during a particular container deployment and may use this information during subsequent container deployment simulations. For example, the knowledge corpus 208 may compare source code changes between a successful deployment and a deployment that contained errors.

The knowledge corpus 208 may include information pertaining to the skill level of the user that is performing the container deployment simulation. The knowledge corpus 208 may include the analysis of the software code in the container as well as analysis of the container software and functionalities.

The knowledge corpus 208 may be updated with recommendations 210 for a given error. The recommendations 210 may be manually entered to the knowledge corpus 208 by the user. The knowledge corpus 208 may also be updated with recommendations 210 that were used in previous deployments. For example, if different recommendations 210 were provided for the same error, then all of these provided recommendations 210 may be stored in the knowledge corpus 208 for that particular error. The knowledge corpus 208 may also include an analysis of the container software and the container functionalities as well as an analysis of the source code in the given container.

Recommendations 210 and other information, described above, in the knowledge corpus 208 may be clustered into different clusters. For example, a k-means++ algorithm may be used to cluster the recommendations 210 and other information and aggregate them into clusters. As such, like recommendations 220 and information may be clustered together to form a single cluster. For example, recommendations 220 and information respecting successful deployment simulations may be clustered in one cluster whereas recommendations 220 and information pertaining to container software may be clustered into a different cluster.

During the container deployment simulation, other factors may be considered by the container deployment simulation program 110a, 110b. For example, the container deployment simulation program 110a, 110b may consider a language setting, a time zone setting, network parameters, environmental parameters, deployment timing, or deployment sequence. For example, the container deployment simulation program 110a, 110b, using the knowledge corpus 208, may determine which container, either an application container or a database container, should be deployed first. The container deployment simulation program 110a, 110b may also consider a security configuration setting, such as, for example, determining which user has access to the simulation.

Once the container deployment simulation is performed, one or more recommendations 210 may be provided to the user. The recommendations 210 may be ranked from the most applicable recommendation 210 appearing first and the least applicable appearing last. Further, each recommendation 210 may be assigned a weight value. The weight value may be set by the user as part of the ground truth. In addition, the weight values may be adjusted with subsequent simulation runs. In an embodiment, only one recommendation 210 is provided to the user. In an alternative embodiment, a list of recommendations 210 are provided, with the most applicable recommendation 210 appearing first. The list of recommendations 210 may include two or more recommendations 210.

Figure 3:
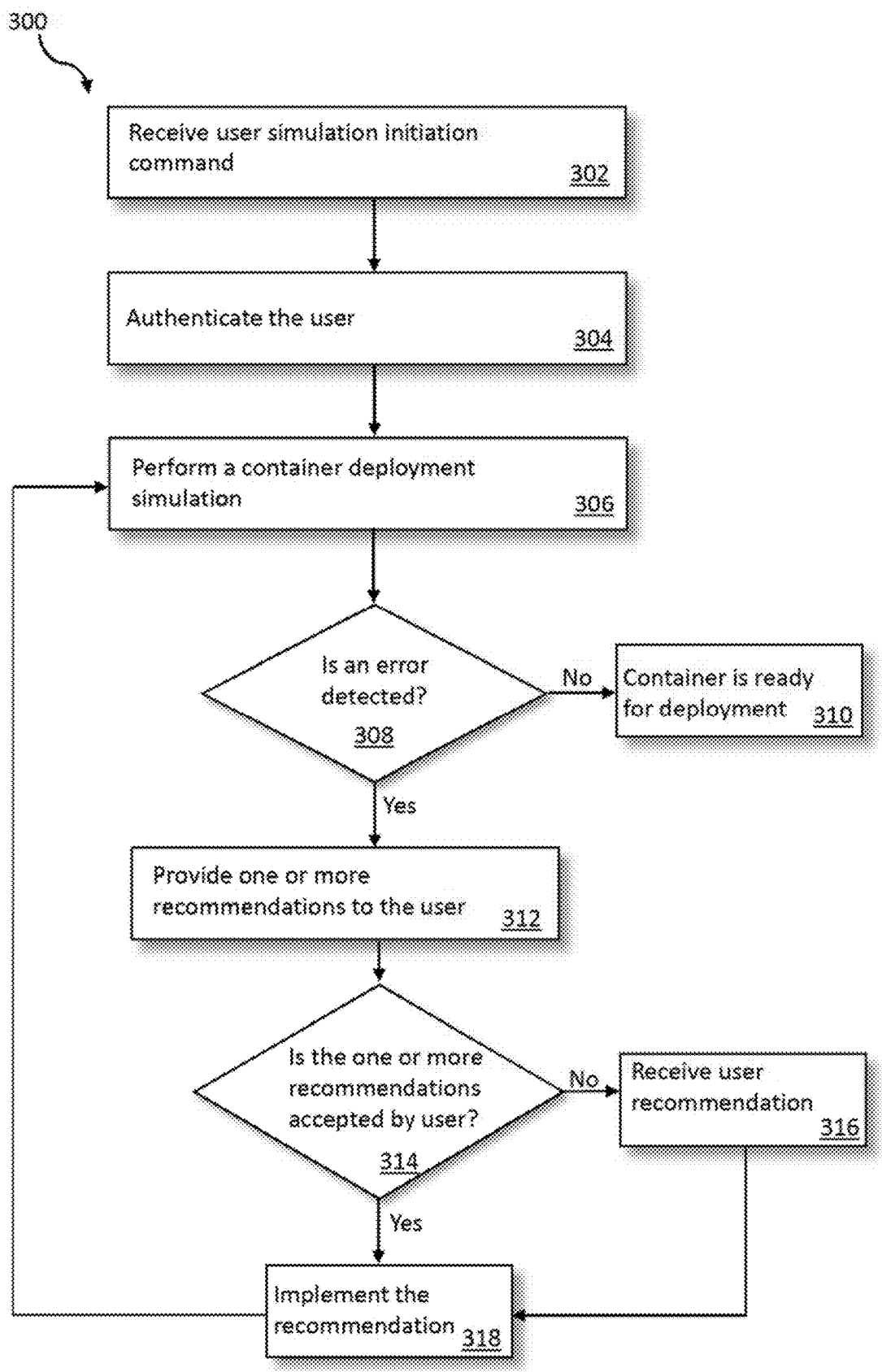
FIG. 3 is an operational flow chart illustrating a process for simulating a container deployment, in accordance with an embodiment of the invention.

Referring now to FIG. 3, an operational flow chart 300 according to at least one embodiment is depicted. The operational flow chart 300 illustrates simulating a container deployment by the container deployment simulation program 110a, 110b.

At operation 302, the user's command 202 is received. The command 202 may be a voice command, a gesture command, a key input, a biometric scan, or any other command that is supported by the container deployment simulation program 110a, 110b. For example, the user may use virtual reality glasses to perform the container deployment simulation. After putting the virtual reality glasses on, the user may initiate the container deployment simulation utilizing a biometric scan. For example, the user may have the user's eyes scanned by the virtual reality glasses. Once the biometric scan is complete, the information is relayed to the container deployment simulation program 110a, 110b for user authentication.

In an embodiment, the user may initiate the container deployment simulation by providing the command 202. In an alternative embodiment, the container deployment simulation may be initiated automatically based on code freeze timelines, release plans for planned build cycles, or emergency deployments for various environments. Code freeze timelines may be based on project management plans and may indicate a cut-off date and time for source code check-in by the developers. After the cut-off date and time passes, any further check-in may not be entertained and not considered for the simulation. In an embodiment, an automatic simulation is started when a project management mpp file, an excel tracker file, a project slack channel, a trello dashboard, or any other data source can be read in order to start the simulation for a particular date, or time as inferred by sources.

At operation 304, the user is authenticated. Once the command 202 is received, the user authentication is performed to determine whether the user is authorized to perform the desired simulation. During the authentication, different criteria 204 may be analyzed to determine whether the user, who is attempting to run the simulation, is authorized to do so. In addition, information form IoT devices may be used during authentication. For example, IoT devices may provide information as to the location of the user. The IoT devices may also indicate what device the user is using to run the simulation.

There may be many users who may perform container deployment simulations. For example, there may be users from different teams, such as, for example, development, production, staging, beta testing, or performance. Each user may have different privileges associated with container deployment simulations. For example, user A is from the development team. User A is attempting to perform a container deployment simulation. User A is authorized to perform a container deployment simulation on virtual reality glasses only. Further, user A may only perform the simulation at work. User A provides a command gesture by stating "start simulation." The container deployment simulation program 110a, 110b may use voice recognition to determine that the user, who is attempting to perform the simulation, is in fact user A, and that user A is authorized to perform the simulation. Further, the container deployment simulation program 110a, 110b may determine that user A is trying to perform the simulation using virtual reality glasses and that user A is at work. Since user A has met all of the criteria to perform the simulation, user A is allowed to continue with the simulation.

In another example, user B is attempting to perform a container deployment simulation using a mobile phone. User B provides the command 202 in the form of a gesture. The container deployment simulation program 110a, 110b determines that user B is authorized to perform simulation A using virtual reality glasses only. Since user B is attempting to perform the simulation using a mobile phone, user B may not be authenticated and may not perform the simulation.

In yet another example, user C is attempting to perform a container deployment simulation A while at home. User C provides the command 202 by stating "start simulation." The container deployment simulation program 110a, 110b determines that user C is authorized to perform the simulation only if user C is at work. Even though user C is authorized to perform the simulation, because user C is at home and not at work, user C may not be authenticated and may not perform the simulation.

At operation 306, the container deployment simulation is performed. In an embodiment, automated scripts 206 may be triggered to pull a project source code from a source repository. Automated scripts 206 may be jobs which pull the project source code from the source repository at predefined regular intervals, or based on user authentication. The source code may be associated with the particular container that is being used for the simulation. The pulled source code may be converted to an image through docker container. This may be referred to as a source to image process. In an embodiment, the container deployment simulation program 110a, 110b may recommend deployment down times that the user may accept or reject.

During the container deployment simulation, the knowledge corpus 208 is utilized to create a correlation pattern between information from the knowledge corpus 208 and information from the container. For example, container A is being used to perform the container deployment simulation. Container A has been previously used in ten other simulations. The knowledge corpus 208 contains information from the ten simulations. The information from the ten previous simulations may be used to determine whether the current simulation displays similar or different characteristics leading to either failure or success. The information may include, but is not limited to, information relating to application server container installation, database server container installation, security pack container installations, hot-fix pack container installation, build/development of enterprise software for priority one issues on production.

Further, during the container deployment simulation, the container type, container software, and platforms for performing the simulation activity may be known. For example, the container deployment simulation program 110a, 110b may understand whether the container that is being used for the simulation is a database container, or a different type of a container. As such, each container may be treated different. For example, the database container may be treated differently from a python/java application. For example, a container for a front-end website (python/java based source code) may have different software libraries and related information, such as, ReadMe files, while a container for a back-end database may encompass files indicating database server as a storage tier.

The container deployment simulation program 110a, 110b may analyze the container software and may be able to identify the deployment scenario that may lead to potential failures. The deployment scenario may be compared to the knowledge corpus 208 to determine whether there are recommendations, or solution options available, if potential failures exist. In addition to differentiating between container types, the container deployment simulation program 110a, 110b may also differentiate between data migration and functional simulation. Data migration may refer a process of moving data from one platform, such as, for example, IBM Cloud® to another platform, such as, for example, Microsoft Cloud® including data between on-premise platform applications. Functional simulation may imply that an application library source code, encompassing a business functionality, may be getting simulated for build and deployment. The container deployment simulation program 110a, 110b may understand that a data migration process may not require any simulation because the data migration process does not involve any build/deployment process to any production environment. However, the container deployment simulation program 110a, 110b, may understand that functional simulation may require a mandatory build and deployment to a production environment, thus requiring a container deployment simulation.

In an embodiment, container deployment simulation dependency may also be considered. For example, team X has two users, user A and user B. Both user A and user B are collaborating on the same project, but user A is developing an application container whereas user B is developing a database container. When running their respective container deployment simulations, using virtual reality headsets, both users need to know information pertaining to the other's simulations. For example, the virtual reality headset of user A, utilizing the container deployment simulation program 110a, 110b, may gather information from the knowledge corpus 208 about the container simulation performed by user B, and vice versa. As a result, the container deployment simulation of user A may be connected to the container deployment simulation of user B such that there may be an exchange of information between both simulations.

At operation 308, it is determined whether an error is detected. If no errors are detected during the container deployment simulation, then at operation 310, the container is ready for actual deployment. If an error is detected, then at operation 312, a recommendation 210 to fix the error is provided to the user. In an embodiment, a plurality of recommendations 210 may be provided, with the most applicable recommendation 210 appearing first. For example, if an error is detected, three recommendations 210 may be displayed on the device the user is using to perform the simulation. Out of the three recommendations 210, the first listed recommendation 210 may be the recommendation 210 that is most applicable to the error that was detected.

The container deployment simulation program 110a, 110b may also provide recommendations 210 respecting deployment time lengths. This may provide insights into development and production environments. The insight may allow the user to determine adequate down times that are necessary to perform the actual deployments such that they are performed quickly and efficiently.

In an embodiment, an error may be detected but no recommendations 210 may be provided to the user. This may occur when the simulation is being performed on a new container. If no recommendation 210 is provide to the user, then the user may identify reasons why the container may be failing and take appropriate action, such as, for example, providing his/her own recommendation 210. The recommendation 210 provided by the user may be associated with the particular error and may be stored in the knowledge corpus 208. In an embodiment, a new container may have the knowledge corpus 208 from other containers that were previously used to run simulations.

At operation 314, the user may either accept or reject the recommendation 210 provided by the container deployment simulation program 110a, 110b. If the user accepts the recommendation 210, then at operation 318, the accepted recommendation 210 is implemented. The accepted recommendation 210 may be applied in the container software such that no additional effort may be needed to fix the error.

Once the recommendation 210 is implemented, the container deployment simulation program 110a, 110b moves back to operation 306 to perform the container deployment simulation again. Operations 306 to 318 may be repeated until, at operation 308, no error is detected, and the container is ready for actual deployment (at operation 310).

The user may reject the recommendation 210 provided. In such a case, the user, at operation 316, may provide the user's own recommendation. For example, the user is an experienced developer who has dealt with numerous container deployment simulations. The user understands that the provided recommendation 210 may not address the error that was detected during the container deployment simulation. As a result, the user decides to reject the recommendation 210 provided and input his/her own recommendation.

Once the user's recommendation is received, the recommendation is implemented, at operation 318. The container deployment simulation program 110a, 110b moves back to operation 306 to perform the container deployment simulation again in order to determine whether the recommendation, provided by the user, resolved the error. If the user recommendation fixes the error, and no new errors are detected, then at operation 308 no error is detected, and the container is ready for actual deployment. If the user recommendation fixes the error, but a new error is detected, then the process moves to operation 312 and a recommendation 210 for the new error is provided to the user and the process moves forward as described above. Further, operations 306 to 318 may be repeated until, at operation 308, no error is detected, and the container is ready for actual deployment (at operation 310).

The container deployment simulation program 110a, 110b may learn, using machine learning, from the decision the user makes at operation 314. When the user accepts the proposed recommendation 210, the container deployment simulation program 110a, 110b may reward the recommendation 210 chosen by the user and may assign it more weight value. However, when the user rejects the proposed recommendation 210, that recommendation 210 may be penalized, and its weight value may be reduced. The container deployment simulation program 110a, 110b may use the fact that the user rejected the recommendation 210 to determine that the recommendation 210 was not accurate. During a subsequent container deployment simulation, the recommendation 210 that was assigned more weight value may be given to the user as a possible solution to the error. However, the recommendation 210 whose weight value was reduced may not be given to the user. Rather, a different recommendation 210 may be provided to the user. For example, during a container deployment simulation, an error is detected. There are ten recommendations 210 for that particular error, however, the user receives the top three recommendations 210. The user decides to accept the first recommendation 210. Because the user accepted the first recommendation 210, that recommendation 210 is assigned more weight value. In addition, the remaining two recommendation 210 may also get assigned more weight value. If the user decides to reject the first recommendation 210, but instead choses the second or the third recommendation 210, then the chosen recommendation 210 may get assigned more weight value and the rejected recommendation 210 may have its weight value reduced. During a subsequent container simulation deployment, the rejected recommendation 210 may not appear in the top three recommendations 210 provided by the container deployment simulation program 110a, 110b.

The use of the container deployment simulation program 110a, 110b to simulate a container deployment is illustrated with the following example.

A user is a developer in a DevOps team. The user's primary job is to perform build/deploy activities based on a planned schedule. There is a planned production deployment and the user has taken approval for two hours of down time.

Without the implementation of the embodiments of the present invention, the user performs the actual deployment, rather than performing a container deployment simulation. During the actual deployment, the user receives a notification about the container deployment failing. The user spends more than the two-hour down time on troubleshooting and figuring out why the deployment failed. This translates to significant loss of business and money.

With the implementation of the embodiments of the present invention, the user wears a virtual reality headset that has been configured to perform container deployment simulations. The user provides the command 202 by saying "start simulation." The user is authenticated, and the container deployment simulation starts. Automated scripts 206 are triggered to pull source code from a source repository. The pulled source code is converted to an image or a series of images through docker containers. The build is successful, but the container deployment simulation fails on a target environment because an error is detected. The error is analyzed, and it is predicted that the deployment simulation failed because of connection unavailability. More particularly, it is detected that a deployment property around a connection enablement was changed form N to Y, when compared with the last successful deployment. The user is provided a recommendation 210 to resolve the error. The recommendation 210 indicates that the connection enablement should be changed back to N. The user accepts the recommendation 210. The recommendation 210 is automatically implemented, and the connection enablement is changed back to N. The user performs the container deployment simulation again and receives no errors. As a result, the user may conclude that the container is ready for deployment. During the actual deployment, the user is able to complete the planned production deployment well within the allotted two-hour down time thus saving the business time and money.

Since the user accepted the recommendation 210, that recommendation 210 has its weight value increased. As a result, during subsequent container simulations, if the same type of error occurs, then this recommendation 210, indicating that the connection enablement should be changed back to N, may be provided to the user as an option. If the user were to reject the recommendation 210, then during subsequent container simulations with the same type of error that recommendation 210 will not have been provided to the user as an option. Rather, a different recommendation 210 will have been provided.

Embodiments of the present invention may gather information, in the knowledge corpus 208, pertaining to reasons why a particular container simulation failed, and one or more errors occurred. Embodiments of the present invention use the gathered information and may identify when the container may be developed so that environmental related parameters related to the failures may be prevented. For example, some deployment failures may be due to the current state of an environment, such as, the hard disk being almost at full capacity, or the CPU being heavily used. These environmental parameters may be compared against historical successes and failures to determine the possibility of a container deployment failure during the time of the simulation. Further, the time of deployment may also be considered. For example, the current state of the hard disk indicates that it is not at full capacity. Considering the time of deployment allows to determine whether, at the time of deployment, the hard disk will have enough capacity to allow the container to be deployed successfully.

It should be appreciated that FIGS. 2-3 provide only an illustration of one embodiment and do not imply any limitations with regard to how different embodiments may be implemented. Many modifications to the depicted embodiment(s) may be made based on design and implementation requirements.

Figure 4:
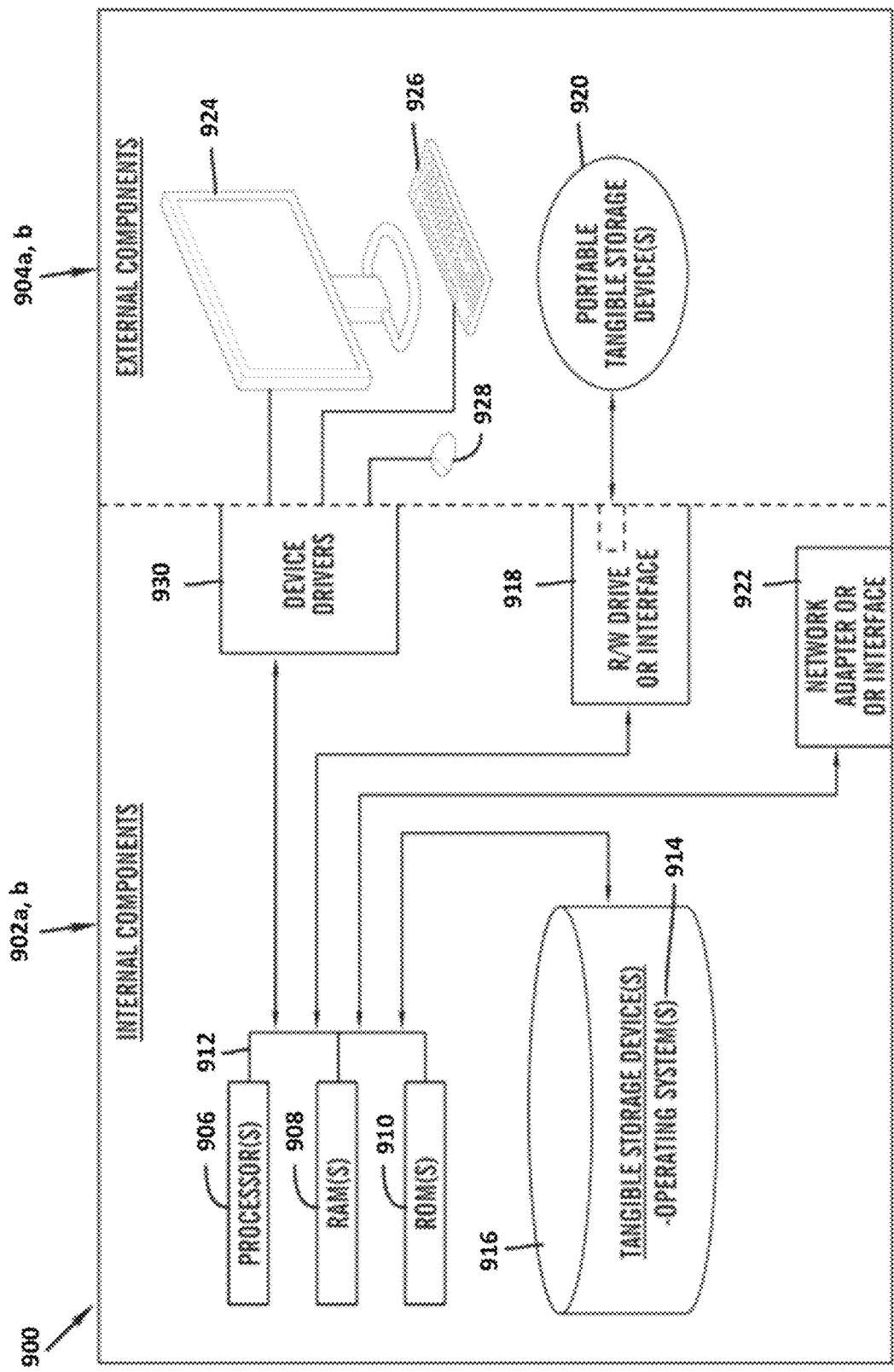
FIG. 4 is a block diagram depicting internal and external components of computers and servers depicted in FIG. 1, in accordance with an embodiment of the invention.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The computers depicted in FIG. 1 may be representative of any electronic device capable of executing machine-readable program instructions. The computers may be representative of a smart phone, a computer system, PDA, or other electronic devices. Examples of computing systems, environments, and/or configurations may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b, and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the container deployment simulation program 110a in client computer 102, and the container deployment simulation program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the container deployment simulation program 110a, 110b can be stored on one or more of the respective portable computer-readable tangible storage devices 920, read via the respective R/W drive or interface 918 and loaded into the respective hard drive.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the container deployment simulation program 110a in client computer 102 and the container deployment simulation program 110b in network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the container deployment simulation program 110a in client computer 102 and the container deployment simulation program 110b in network server 112 are loaded into the respective hard drive. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems, or storage. The consumer does not manage or control the underlying web-based or cloud-based infrastructure including databases, corpora, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
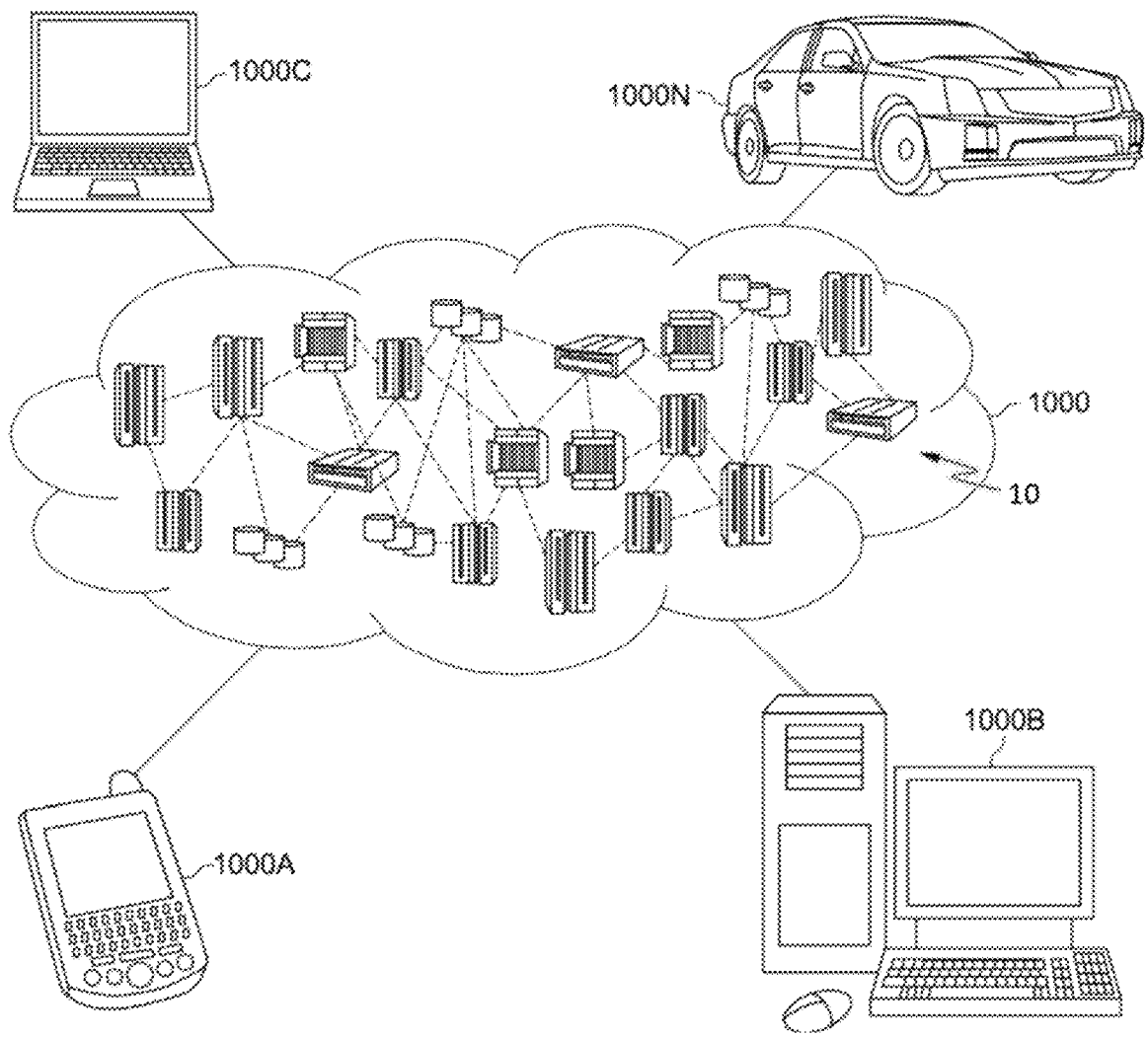
FIG. 5 is a functional block diagram depicting a cloud computing environment including the computer system depicted in FIG. 1, in accordance with an embodiment of the invention.

Referring now to FIG. 5, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 10 and cloud computing environment 1000 can communicate with any type of computerized device over any type of network and/or network addressable connection (e.g., using a web browser).

Figure 6:
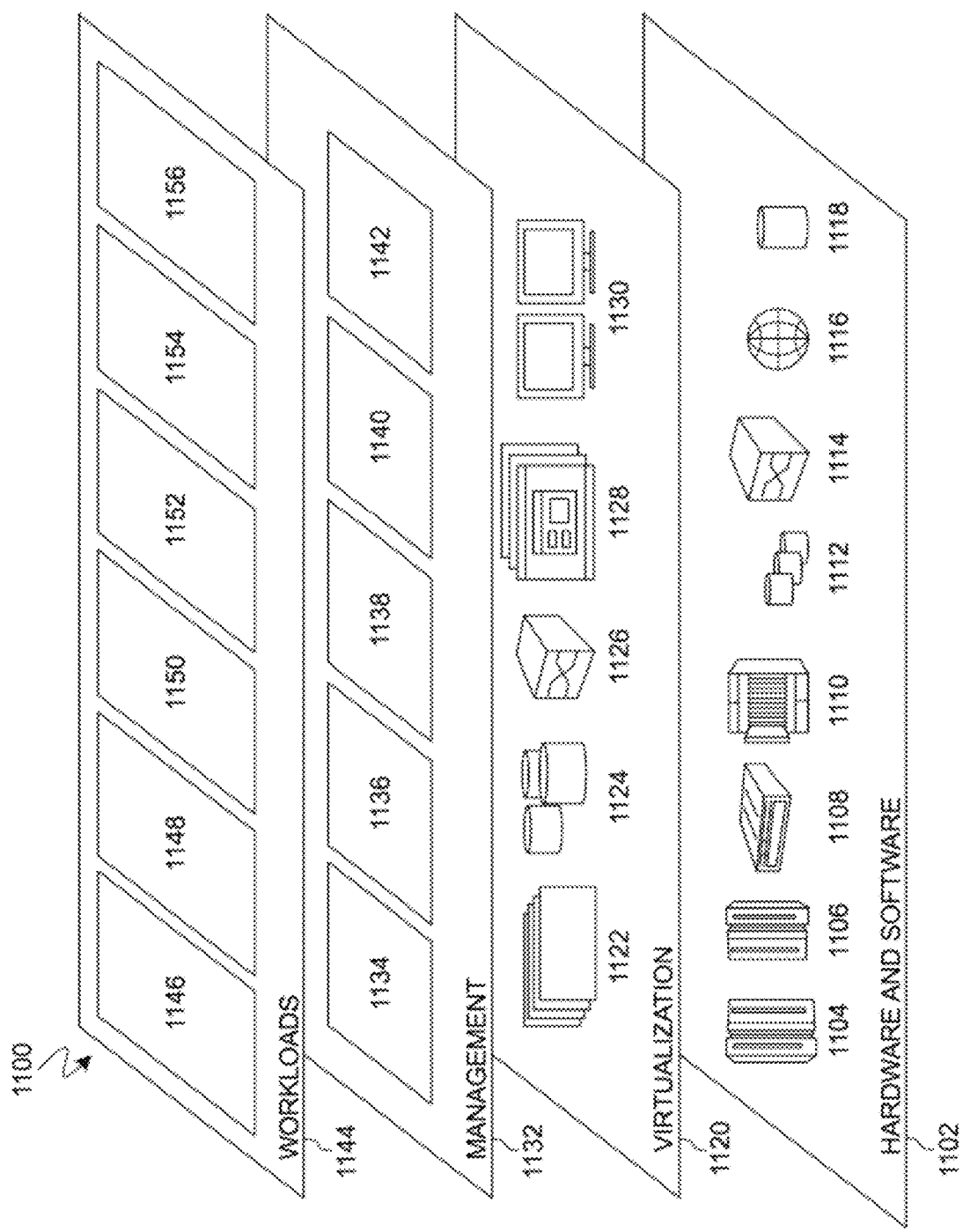
FIG. 6 is a diagram depicting abstraction model layers provided by the cloud computing environment of FIG. 5, in accordance with an embodiment of the invention.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deep model learning 1156. A container deployment simulation program 110a, 110b provides a way to use provenance data to gain insights during a deep learning model training phase.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a container deployment simulation, the computer-implemented method comprising:
    a processor receiving a simulation initiation command from a user; and executing by the processor the simulation initiation command to authenticate the user;
    performing a container deployment simulation;
    detecting a container deployment simulation error;
    in response to detecting the container deployment simulation error, providing one or more recommendations to the user, the one or more recommendations given a weight value based on a success rate of fixing the container deployment simulation error and including a length of downtime during deployment of the container; and
    in response to receiving an acceptance of the recommendation from the user, implementing the recommendation, wherein the one or more recommendations are ranked when provided to the user based on the weight value.

2. The method of claim 1, further comprising:
    in response to receiving a rejection of the recommendation from the user, receiving a user recommendation;
    implementing the user recommendation; and
    performing the container deployment simulation.

3. The method of claim 1, further comprising:
    in response to detecting no container deployment simulation error, providing a recommendation to the user that the container is ready for actual deployment.

4. The method of claim 1, wherein the weight value of the one or more recommendations is increased when the user accepts the one or more recommendations.

5. The method of claim 1, wherein the weight value of the one or more recommendations is reduced when the user rejects the one or more recommendations.

6. A computer system for a container deployment simulation, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving a simulation initiation command from a user; and executing by the one or more processors the simulation initiation command to authenticate the user;
performing a container deployment simulation;
detecting a container deployment simulation error;
in response to detecting the container deployment simulation error, providing one or more recommendations to the user, the one or more recommendations given a weight value based on a success rate of fixing the container deployment simulation error and including a length of downtime during deployment of the container; and
in response to receiving an acceptance of the recommendation from the user, implementing the recommendation, wherein the one or more recommendations are ranked when provided to the user based on the weight value.

7. The computer system of claim 6, further comprising:
in response to receiving a rejection of the recommendation from the user, receiving a user recommendation;
implementing the user recommendation; and
performing the container deployment simulation.

8. The computer system of claim 6, further comprising:
in response to detecting no container deployment simulation error, providing a recommendation to the user that the container is ready for actual deployment.

9. The computer system of claim 6, wherein the weight value of the one or more recommendations is increased when the user accepts the one or more recommendations.

10. The computer system of claim 6, wherein the weight value of the one or more recommendations is reduced when the user rejects the one or more recommendations.

11. A computer program product for a container deployment simulation, comprising:
one or more computer-readable tangible storage media and program instructions stored on at least one of the one or more computer-readable tangible storage media, the program instructions executable by a processor to cause the processor to perform a method comprising:
receiving a simulation initiation command from a user; and executing by the processor the simulation initiation command to authenticate the user;
performing a container deployment simulation;
detecting a container deployment simulation error;
in response to detecting the container deployment simulation error, providing one or more recommendations to the user, the one or more recommendations given a weight value based on a success rate of fixing the container deployment simulation error and including a length of downtime during deployment of the container; and
in response to receiving an acceptance of the recommendation from the user, implementing the recommendation, wherein the one or more recommendations are ranked when provided to the user based on the weight value.

12. The computer program product of claim 11, further comprising:
in response to receiving a rejection of the recommendation from the user, receiving a user recommendation;
implementing the user recommendation; and
performing the container deployment simulation.

13. The computer program product of claim 11, further comprising:
in response to detecting no container deployment simulation error, providing a recommendation to the user that the container is ready for actual deployment.

14. The computer program product of claim 11, wherein the weight value of the one or more recommendations is increased when the user accepts the one or more recommendations.

* * * * *